(12) United States Patent
Liu et al.

(10) Patent No.: US 12,735,074 B2
(45) Date of Patent: Sep. 15, 2026

(54) VEHICLE BEHAVIOR PREDICTION METHOD AND APPARATUS, ELECTRONIC DEVICE, AND STORAGE MEDIUM

(71) Applicant: BEIJING JINGDONG QIANSHI TECHNOLOGY CO., LTD., Beijing (CN)

(72) Inventors: Jiangjiang Liu, Beijing (CN); Liangliang Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 310 days.

(21) Appl. No.: 17/904,721

(22) PCT Filed: Dec. 31, 2020

(86) PCT No.: PCT/CN2020/142082
§ 371 (c)(1),
(2) Date: Aug. 22, 2022

(87) PCT Pub. No.: WO2021/169591
PCT Pub. Date: Sep. 2, 2021

(65) Prior Publication Data

US 2023/0077347 A1 Mar. 16, 2023

(30) Foreign Application Priority Data

Feb. 28, 2020 (CN) ........................ 202010127544.X

(51) Int. Cl.
*B60W 60/00* (2020.01)
*B60W 30/095* (2012.01)
(Continued)

(52) U.S. Cl.
CPC .. *B60W 60/00274* (2020.02); *B60W 30/0956* (2013.01); *B60W 30/18154* (2013.01);
(Continued)

(58) Field of Classification Search
None
See application file for complete search history.

(56) References Cited

U.S. PATENT DOCUMENTS 9,672,734 B1 * 6/2017 Ratnasingam ... G08G 1/096741
2014/0046581 A1 * 2/2014 Ota .................... G08G 1/09626
701/408
(Continued)

FOREIGN PATENT DOCUMENTS

CN 101451851 A 6/2009
CN 106408975 A 2/2017
(Continued)

OTHER PUBLICATIONS

Translation of KR-20190054612-A (Year: 2017).*
(Continued)

*Primary Examiner* — Adam D Tissot
*Assistant Examiner* — Charles Pall
(74) *Attorney, Agent, or Firm* — Qinghong Xu

(57) ABSTRACT

The present disclosure provides a vehicle behavior prediction method and apparatus, an electronic device, and a computer-readable storage medium, which relates to the field of intelligent driving. The method includes: determining a target traffic light corresponding to t a target vehicle a current intersection; determining a neighboring traffic light corresponding to the target traffic light and the indication status of the neighboring traffic light according to the target traffic light, the indication status of the target traffic light and a traffic light status mapping relationship table; acquiring a position of an obstacle vehicle and predicting each possible travel path of the obstacle vehicle, and determining a traffic light corresponding to each possible travel path; and determining a final possible travel path of the obstacle vehicle according to each possible travel path and the indication
(Continued)

determining a drivable path of each intersection according to a lane topology relationship in an electronic map — S310 determining, for each drivable path, a traffic light on the travel path from the initial lane to the target lane, and establishing a mapping relationship among the initial lane, the target lane and the traffic light — S320 status of the traffic light corresponding to each possible travel path.

10 Claims, 3 Drawing Sheets

(51) Int. Cl.
*B60W 30/18* (2012.01)
*B60W 40/04* (2006.01)
*B60W 50/00* (2006.01)

(52) U.S. Cl.
CPC ........ *B60W 40/04* (2013.01); *B60W 50/0097* (2013.01); *B60W 60/0015* (2020.02); *B60W 2554/4041* (2020.02); *B60W 2554/4045* (2020.02); *B60W 2554/4046* (2020.02); *B60W 2555/60* (2020.02); *B60W 2556/40* (2020.02)

(56) References Cited

U.S. PATENT DOCUMENTS

2016/0282879 A1* 9/2016 Ichikawa ........... G01C 21/3658
2018/0372504 A1 12/2018 Singhal et al.
2019/0259282 A1* 8/2019 Ji .................... B60W 30/18154
2019/0317511 A1 10/2019 Xu et al.
2019/0333373 A1* 10/2019 Fang ...................... G08G 1/052
2021/0107476 A1* 4/2021 Cui ................. B60W 60/00276
2021/0409650 A1* 12/2021 Kobayashi ........... G08G 1/0129
2023/0319140 A1* 10/2023 Tran ...................... B60W 40/02 709/203

FOREIGN PATENT DOCUMENTS

CN 106898147 A 6/2017
CN 107144290 A 9/2017
CN 108831175 A 11/2018
CN 109584571 A 4/2019
CN 109801508 A 5/2019
CN 109878515 A 6/2019
CN 110502012 A 11/2019
CN 110542931 A 12/2019
CN 111380555 A 7/2020
JP H07129888 A 5/1995
JP 2006215627 A 8/2006
JP 2012008752 A 1/2012
JP 2014032544 A 2/2014
JP 2018197966 A 12/2018
JP 2019158380 A 9/2019
JP 2019202722 A 11/2019
KR 20190054612 A * 11/2017 ............ B60W 30/08
KR 20190099475 A 8/2019
KR 20190143836 A 12/2019

OTHER PUBLICATIONS

International Search Report dated Mar. 30, 2021 of PCT International Application No. PCT/CN2020/142082.
The First Office Action dated Jul. 1, 2021 of Chinese Patent No. 202010127544.X.
Extended European Search Report dated Dec. 18, 2023 for European Application No. 20920881.8.
1st Office Action dated Oct. 3, 2023 for Japanese Application No. 2022-544173.
1st Office Action dated Sep. 4, 2024 of Korean Application No. 10-2022-7024934.

* cited by examiner

VEHICLE BEHAVIOR PREDICTION METHOD AND APPARATUS, ELECTRONIC DEVICE, AND STORAGE MEDIUM

CROSS REFERENCE

The present application is based upon International Application No. PCT/CN2020/142082, filed on Dec. 31, 2020, which is based upon and claims priority to Chinese Patent Application No. 202010127544.X, filed on Feb. 28, 2020, entitled "VEHICLE BEHAVIOR PREDICTION METHOD AND APPARATUS, ELECTRONIC DEVICE, AND STORAGE MEDIUM", and the entire contents thereof are incorporated herein by reference.

TECHNICAL FIELD

The present disclosure relates to the field of intelligent driving, and in particular, to a vehicle behavior prediction method, a vehicle behavior prediction apparatus, an electronic device, and a computer-readable storage medium.

BACKGROUND

In the autonomous driving system, when the autonomous driving vehicle passes through the intersection with traffic lights, it can determine the driving state of the vehicle according to the indication status of the traffic lights on the current navigation path. In addition, the behavior of other vehicles at the intersection can also be predicted to further improve the accuracy of the vehicle's driving state.

It should be noted that, information disclosed in the above background portion is provided only for better understanding of the background of the present disclosure, and thus it may contain information that does not form the prior art known by those ordinary skilled in the art.

SUMMARY

The present disclosure intends to provide vehicle behavior prediction method, a vehicle behavior prediction apparatus, an electronic device, and a computer-readable storage medium.

According to one aspect, the present disclosure provides a vehicle behavior prediction method, including:

- acquiring a path that a target vehicle will travel at a current intersection;
- determining a target traffic light corresponding to the path;
- acquiring an indication status of the target traffic light;
- determining a neighboring traffic light corresponding to the target traffic light and the indication status of the neighboring traffic light according to the target traffic light, the indication status of the target traffic light and a traffic light status mapping relationship table;
- acquiring a position of an obstacle vehicle;
- predicting each possible travel path of the obstacle vehicle at the current intersection according to the position of the obstacle vehicle, and determining a traffic light corresponding to each possible travel path, wherein the neighboring traffic light includes the traffic light corresponding to each possible travel path; and
- determining a final possible travel path of the obstacle vehicle according to each possible travel path and the indication status of the traffic light corresponding to each possible travel path.

In one embodiment, the method further includes:

- determining a drivable path of each intersection according to a lane topology relationship in an electronic map; wherein the drivable path includes an initial lane and a target lane; and
- determining, for each drivable path, a traffic light on the travel path from the initial lane to the target lane, and establishing a mapping relationship among the initial lane, the target lane and the traffic light.

In one embodiment, establishing of the traffic light status mapping relationship table includes:

- for each intersection in an electronic map, obtaining the indication status of a single traffic light at the intersection, and the indication status of other traffic light at the intersection during the indication status of the single traffic light; and
- establishing a mapping relation among the single traffic light, the indication status of the single traffic light, the other traffic light and the indication status of the other traffic light, to obtain the traffic light status mapping relationship table.

In one embodiment, the obtaining the position of the obstacle vehicle and predicting each possible travel path of the obstacle vehicle at the current intersection according to the position of the obstacle vehicle includes:

- determining a position of the obstacle vehicle, and determining a lane in which the obstacle vehicle is located according to the position; and
- predicting each possible travel path of the obstacle vehicle at the current intersection according to the lane in which the obstacle vehicle is located and the lane topology relationship.

In one embodiment, each possible travel path is formed by at least two lanes in sequence; and

- the determining the traffic light corresponding to each possible travel path includes:
- determining the traffic light corresponding to every two consecutive lanes in each possible travel path, according to the mapping relationship among the initial lane, the target lane and the traffic light; and
- using the determined traffic light as the traffic light corresponding to each possible travel path.

In one embodiment, the determining the final possible travel path of the obstacle vehicle according to each possible travel path and the indication status of the traffic light corresponding to each possible travel path includes:

- for each possible travel path, if the indication status of the traffic light corresponding to the possible travel path is a red light or a yellow light, updating the possible travel path to the lane before the traffic light; and
- determining a set including each possible travel path of the obstacle vehicle as the final possible travel path of the obstacle vehicle.

In one embodiment, the updating the possible travel path to the lane before the traffic light includes:

- obtaining a coordinate sequence of the lane before the traffic light;
- removing coordinates located behind the obstacle vehicle in the coordinate sequence according to the position of the obstacle vehicle, to obtain a processed coordinate sequence; and
- determining a path formed by the processed coordinate sequence as the possible travel path of the obstacle vehicle.

In one embodiment, after updating the possible travel path to the lane before the traffic light, the method further includes:

predicting that a speed and an acceleration of the obstacle vehicle are both zero when the obstacle vehicle reaches a stop line corresponding to the traffic light.

According to a second aspect, the present disclosure provides a vehicle behavior prediction apparatus, including:

a target traffic light determining module, configured to acquire a path that a target vehicle will travel at a current intersection and determine a target traffic light corresponding to the path;

a traffic light and status determining module, configured to acquire an indication status of the target traffic light, and determine a neighboring traffic light corresponding to the target traffic light and the indication status of the neighboring traffic light according to the target traffic light, the indication status of the target traffic light and a traffic light status mapping relationship table;

a possible travel path predicting module, configured to acquire a position of an obstacle vehicle, predict each possible travel path of the obstacle vehicle at the current intersection according to the position of the obstacle vehicle, and determine a traffic light corresponding to each possible travel path, wherein the neighboring traffic light includes the traffic light corresponding to each possible travel path; and a possible travel path determining module, configured to determine a final possible travel path of the obstacle vehicle according to each possible travel path and the indication status of the traffic light corresponding to each possible travel path.

In one embodiment, the vehicle behavior prediction apparatus further includes:

a lane and traffic light mapping relationship establishing module, configured to determine a drivable path of each intersection according to a lane topology relationship in an electronic map; wherein the drivable path includes an initial lane and a target lane; and determine, for each drivable path, a traffic light on the travel path from the initial lane to the target lane, and establish a mapping relationship among the initial lane, the target lane and the traffic light.

In one embodiment, the vehicle behavior prediction apparatus further includes:

a traffic light status reciprocal establishing module, configured to: for each intersection in an electronic map, obtain the indication status of a single traffic light at the intersection, and the indication status of other traffic light at the intersection during the indication status of the single traffic light; and establish a mapping relation among the single traffic light, the indication status of the single traffic light, the other traffic light and the indication status of the other traffic light, to obtain the traffic light status mapping relationship table.

In one embodiment, the possible travel path determining module is particularly configured to obtain the position of the obstacle vehicle, determine a lane in which the obstacle vehicle is located according to the position; and predict each possible travel path of the obstacle vehicle at the current intersection according to the lane in which the obstacle vehicle is located and the lane topology relationship.

In one embodiment, each possible travel path is formed by at least two lanes in sequence; and the possible travel path determining module is configured to determine the traffic light corresponding to each possible travel path by:

determining the traffic light corresponding to every two consecutive lanes in each possible travel path, according to the mapping relationship among the initial lane, the target lane and the traffic light; and using the determined traffic light as the traffic light corresponding to each possible travel path.

In one embodiment, the possible travel path determining module is configured to: for each possible travel path, if the indication status of the traffic light corresponding to the possible travel path is a red light or a yellow light, update the possible travel path to the lane before the traffic light; and determine a set including each possible travel path of the obstacle vehicle as the final possible travel path of the obstacle vehicle.

In one embodiment, the possible travel path determining module is configured to update the possible travel path to the lane before the traffic light by:

obtaining a coordinate sequence of the lane before the traffic light;

removing coordinates located behind the obstacle vehicle in the coordinate sequence according to the position of the obstacle vehicle, to obtain a processed coordinate sequence; and determining a path formed by the processed coordinate sequence as the possible travel path of the obstacle vehicle.

In one embodiment, the vehicle behavior prediction apparatus further includes:

a driving state predicting module, configured to predict that a speed and an acceleration of the obstacle vehicle are both zero when the obstacle vehicle reaches a stop line corresponding to the traffic light.

According to a third aspect, the present disclosure provides an electronic device, including:

a processor; and a memory, configured to store instructions executable by the processor, wherein the processor is configured to implement any one of the above method by executing the instructions.

According to a fourth aspect, the present disclosure provides a storage medium having a computer program stored thereon, which when being executed by a processor, implements any one of the above method.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure and do not unduly limit the present disclosure.

DETAILED DESCRIPTION

Figure 1:
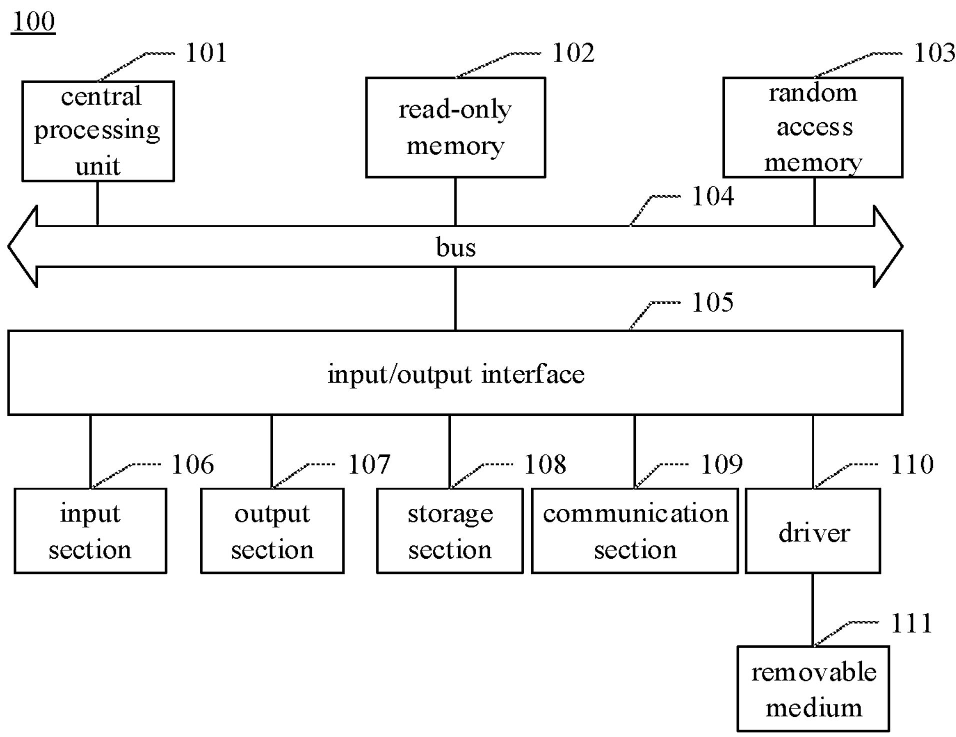
FIG. 1 illustrates a schematic structural diagram of a computer system suitable for implementing an electronic device according to an embodiment of the present disclosure.

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, components, devices, steps, etc. may be employed. In other instances, well-known solutions have not been shown or described in detail to avoid obscuring aspects of the present disclosure.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

FIG. 1 illustrates a schematic structural diagram of a computer system suitable for implementing an electronic device according to an embodiment of the present disclosure.

It should be noted that the computer system 100 of the electronic device shown in FIG. 1 is only an example, and should not impose any limitations on the functions and scope of use of the embodiments of the present disclosure.

As shown in FIG. 1, the computer system 100 includes a central processing unit 101 that can perform various appropriate actions and processes according to programs stored in the read-only memory 102 or loaded into the random access memory 103 from the storage section 108. In the random access memory 103, various programs and data necessary for system operation are also stored. The central processing unit 101, the read-only memory 102, and the random access memory 103 are connected to each other through a bus 104. An input/output interface 105 is also connected to the bus 104.

The following components are connected to the input/output interface 105: an input section 106 including a keyboard, a mouse, etc.; an output section 107 including a cathode ray tube (CRT), a liquid crystal display (LCD), etc., and a speaker, etc.; a storage section 108 including a hard disk, etc.; and a communication section 109 including a network interface card such as a local area network card, a modem, and the like. The communication section 109 performs communication processing via a network such as the Internet. A driver 110 is also connected to the input/output interface 105 as required. A removable medium 111, such as a magnetic disk, an optical disk, a magneto-optical disk, a semiconductor memory, etc., is mounted on the drive 110 as needed so that a computer program read therefrom is installed into the storage section 108 as needed.

According to an embodiment of the present disclosure, the processes described below with reference to the flowcharts may be implemented as computer software programs. For example, embodiments of the present disclosure include a computer program product including a computer program carried on a computer-readable storage medium, the computer program containing program code for performing the method illustrated in the flowchart. In such an embodiment, the computer program may be downloaded and installed from the network via the communication portion 109 and/or installed from the removable medium 111. When the computer program is executed by the central processing unit 101, various functions defined in the method and apparatus of the present application are performed.

It should be noted that the computer-readable storage medium shown in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but are not limited to, electrical connections with one or more wires, portable computer disks, hard disks, random access memory, read only memory, erasable programmable read only memory (EPROM) or flash memory), fiber optics, portable compact disk read only memory (CD-ROM), optical storage devices, magnetic storage devices, or any suitable combination of the foregoing. In this disclosure, a computer-readable storage medium may be any tangible medium that contains or stores a program that can be used by or in conjunction with an instruction execution system, apparatus, or device. In the present disclosure, the computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination of the foregoing. A computer-readable signal medium can also be any computer-readable storage medium other than a computer-readable storage medium, which can send, propagate, or transmit program to be used by or in combination with instruction execution system, apparatus, or device. Program code included in the computer-readable storage medium may be transmitted using any suitable medium including, but not limited to, wireless, wireline, optical fiber cable, radio frequency, etc., or any suitable combination of the foregoing.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code that contains one or more logical functions for implementing the specified functions executable instructions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams or flowchart illustrations, and combinations of blocks in the block diagrams or flowchart illustrations, can be implemented in dedicated hardware-based systems that perform the specified functions or operations, or can be implemented using a combination of dedicated hardware and computer instructions.

The units involved in the embodiments of the present disclosure may be implemented in a software manner, or may be implemented in a hardware manner, and the described units may also be provided in a processor. The name of these units does not constitute a limitation of the unit itself under certain circumstances.

As another aspect, the present application also provides a computer-readable storage medium. The computer-readable storage medium may be included in the electronic device described in the above embodiments, or may be independent while not be installed in the electronic device. The above-mentioned computer-readable storage medium carries one or more programs, and when the above-mentioned one or more programs are executed by an electronic device, it causes the electronic device to implement the methods described in the following embodiments. For example, the electronic device can implement the steps shown in FIG. 2 to FIG. 4.

Hereinafter, the technical solutions of the embodiments of the present disclosure are described in detail.

For autonomous vehicles, making more accurate predictions of other vehicles and pedestrians at intersections can make autonomous vehicles safer and more reliable when passing intersections. The embodiments of the present disclosure provide a method for predicting vehicle behavior, which can improve the accuracy of predicting other vehicles and pedestrians.

Figure 2:
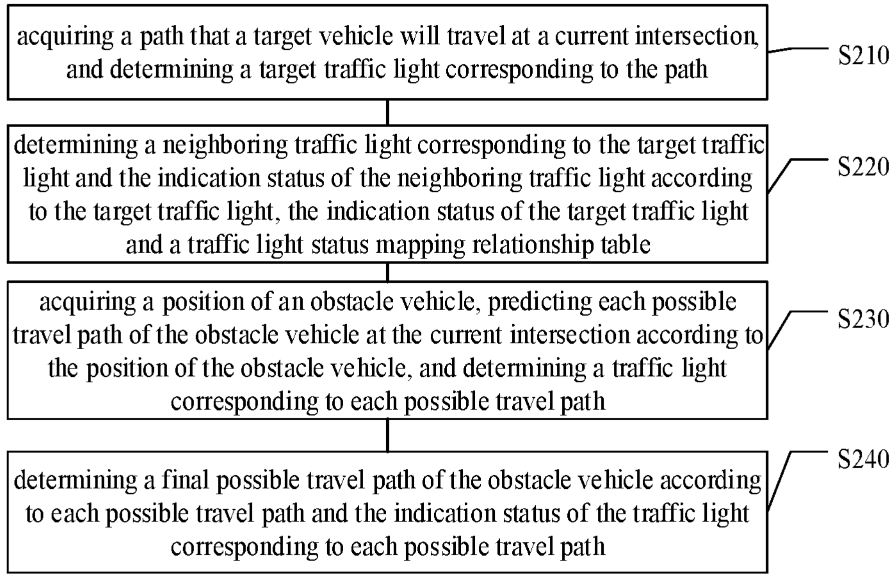
FIG. 2 illustrates a flow chart of a vehicle behavior prediction method in an embodiment of the present disclosure.

Referring to FIG. 2, a flow chart of a vehicle behavior prediction method in an embodiment of the present disclosure is shown, the method includes the following steps.

S210, acquiring a path that a target vehicle will travel at a current intersection, and determining a target traffic light corresponding to the path.

S220, acquiring an indication status of the target traffic light, and determining a neighboring traffic light corresponding to the target traffic light and the indication status of the neighboring traffic light according to the target traffic light, the indication status of the target traffic light and a traffic light status mapping relationship table.

S230, acquiring a position of an obstacle vehicle, predicting each possible travel path of the obstacle vehicle at the current intersection according to the position of the obstacle vehicle, and determining a traffic light corresponding to each possible travel path, wherein the neighboring traffic light includes the traffic light corresponding to each possible travel path.

S240, determining a final possible travel path of the obstacle vehicle according to each possible travel path and the indication status of the traffic light corresponding to each possible travel path.

In the vehicle behavior prediction method of the embodiment of the present disclosure, when the target vehicle is traveling, the corresponding target traffic lights may be determined according to the path the target vehicle will travel, and the indication status of other neighboring traffic lights may be determined according to the indication status of the target traffic light. After that, according to the position of the obstacle vehicle, in conjunction with the indication status of the neighboring traffic lights, the final possible travel path of the obstacle vehicle is determined, which can improve the accuracy of the behavior prediction of the obstacle vehicle. Further, according to the final possible travel path of the obstacle vehicle, the driving stability and safety of the target vehicle can be improved.

The vehicle behavior prediction method according to the embodiment of the present disclosure will be described in more detail below.

In S210, the path that the target vehicle will travel at the current intersection is acquired, and the target traffic light corresponding to the path is determined.

In the embodiment of the present disclosure, the target vehicle may be an autonomous driving vehicle, and the autonomous driving vehicle may generally drive according to a preset navigation path, and the navigation path may include multiple intersections. When passing through each intersection, the target vehicle may go straight, turn right, turn left, etc. The path that the target vehicle will travel at the current intersection refers to turning left, turning right, or going straight, and each path may have a corresponding traffic light. For example, when going straight, it corresponds to a traffic light, when turning left, it can correspond to a traffic light, and when turning right, it can also correspond to a traffic light. Of cause, turning right may have no traffic light, and the vehicle can pass at any time when there is no obstacle vehicles or pedestrians. After determining the path that the target vehicle will travel, the target traffic light corresponding to the path can be determined. The present disclosure may omit the case that there is no corresponding traffic light on the path.

Figure 3:
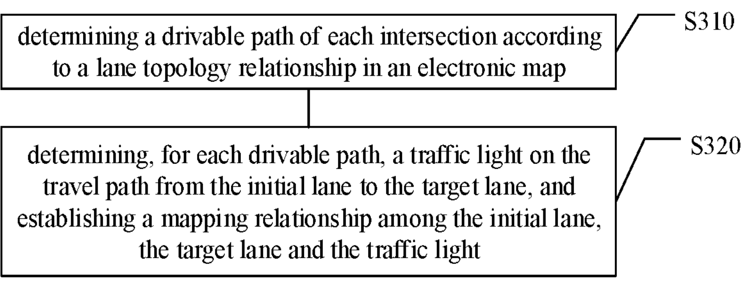
FIG. 3 illustrates a flowchart of a method for establishing a mapping relationship between a travel path and a traffic light in an embodiment of the present disclosure.
Figure 4:
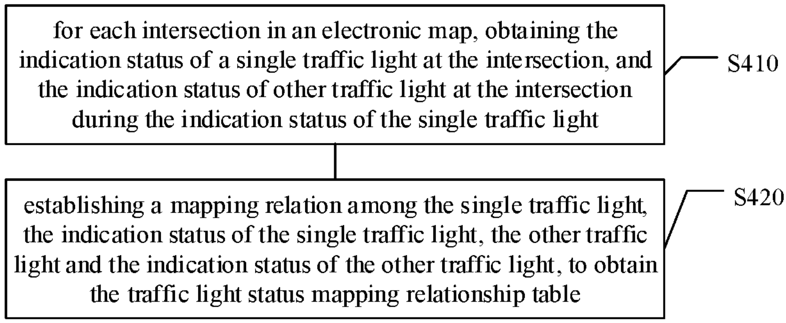
FIG. 4 illustrates a flowchart of a method for establishing a traffic light status mapping relationship table in an embodiment of the present disclosure.

Of course, before this, for each intersection, the mapping relationship between the travel path and the traffic lights can be established in advance. Referring to FIG. 3, it may include the following steps.

S310, determining a drivable path of each intersection according to a lane topology relationship in an electronic map, wherein the drivable path includes an initial lane and a target lane.

At present, the electronic map can contain the topological relationship between the various lanes. For each intersection, the shape of the intersection may be different, such as an intersection, a T-junction, and the like. The shape of the intersection is different, and the corresponding drivable route is also different, and the drivable route of the intersection is the route that can be traveled at the intersection. Here, the drivable path can be represented by two lanes. For example, any lane at the intersection is taken as the initial lane, the lane to be driven on is taken as the target lane, and the initial lane and the target lane can be consecutive adjacent lanes.

S320, determining, for each drivable path, a traffic light on the travel path from the initial lane to the target lane, and establishing a mapping relationship among the initial lane, the target lane and the traffic light.

In the embodiment of the present disclosure, based on the electronic map, if it is determined that the traffic light TL1 is passed by from the lane LANE1 to the lane LANE2, the mapping relationship between the set S{LANE1_ID, LANE2_ID} and the traffic light TL1 can be established. The LANE1_ID, LANE2_ID are the unique identifiers of lane LANE1 and lane LANE2 respectively. In addition, information such as unique identifiers, location coordinates, and orientations of traffic light can also be obtained from the electronic map. It should be noted that a traffic light corresponds to at least one set S, and the set S is ordered and contains two elements, that is, when travelling from the lane represented by the first element of the set S to the lane represented by the second element, the traffic light TL1 is passed by.

Afterwards, the above-mentioned mapping relationship can be stored. In this way, for an ordered set composed of any two lanes, it is possible to find out whether there is a corresponding traffic light in the mapping relationship. Specific query algorithms include, but are not limited to, hash search, sequential search, and the like. As mentioned earlier, for the two lanes when turning right, there may be no corresponding traffic light. Therefore, it is possible that an ordered set of two lanes may have no corresponding traffic light.

In S220, the neighboring traffic light corresponding to the target traffic light and the indication status of the neighboring traffic light are determined according to the target traffic light, the acquired indication status of the target traffic light and a traffic light status mapping relationship table.

In particular, after determining the target traffic light, an image can be captured by a camera, and the captured image can be identified to obtain the indication status of the traffic light. The indication status may include: red light, green light, yellow light, unknown, and the like. If the indication status is unknown, indicating failure of acquiring the indication status of the target traffic light, it is determined that the behavior prediction of the obstacle vehicle fails, and the process ends.

If the indication status of the target traffic light is red light, green light or yellow light, the neighboring traffic light of the target traffic light and the indication status of the neighboring traffic light can be determined according to the traffic light status mapping relationship table. Neighboring traffic lights refer to a traffic light that is close to the target traffic lights. For example, other traffic lights at the same intersection are the neighboring traffic lights of the target traffic light.

The traffic light status mapping relationship table can store the logical relationship between the traffic lights at the same intersection, that is, the indication status of other traffic light when one traffic light is in a certain indication status. The establishing of the traffic light status mapping relationship table can be seen in FIG. 4, which may include the following steps.

S410, for each intersection in an electronic map, obtaining the indication status of a single traffic light at the intersection, and the indication status of other traffic light at the intersection during the indication status of the single traffic light.

Usually, each indication status of a traffic light can last for a period of time. For example, for one traffic light, the duration of the indication status of red light can be 60 seconds, the duration of the indication status of green light can also be 60 seconds, and the duration of the indication status of yellow light can be 5 seconds.

At this time, the traffic light set TGG can be determined, including the traffic light having the indication status of green light within the duration that the indication status of the traffic light TL1 is green light, and the traffic light set TGR can be determined, including the traffic light having the indication status of red light within the duration that the indication status of the traffic light TL1 is green light.

The traffic light set TRG can be determined, including the traffic light having the indication status of green light within the duration that the indication status of the traffic light TL1 is red light, and the traffic light set TRR can be determined, including the traffic light having the indication status of red light within the duration that the indication status of the traffic light TL1 is red light.

The traffic light set TYG can be determined, including the traffic light having the indication status of green light within the duration that the indication status of the traffic light TL1 is yellow light, and the traffic light set TYR can be determined, including the traffic light having the indication status of red light within the duration that the indication status of the traffic light TL1 is yellow light.

The above information can be obtained manually, that is, at the intersection, the time sequence and status relationship between the traffic lights are manually judged to generate the above information. Of course, it can also be achieved by automated methods. For example, a surround view camera can be used to simultaneously capture the status change video of all traffic lights in the intersection, and the video can include a complete status cycle of each traffic light in the intersection (complete red light, complete green light, complete yellow light), and then use the traffic light recognition algorithm (including but not limited to convolutional neural network, deep learning, etc.) to identify the status duration, status switching time, etc., and generate the above information according to the status switching time and the status lasting time.

S420, establishing a mapping relation among the single traffic light, the indication status of the single traffic light, the other traffic light and the indication status of the other traffic light, to obtain the traffic light status mapping relationship table.

Based on the information generated in S410, a traffic light status mapping relationship table may be established. In this way, based on the indication status of the target traffic light, the neighboring traffic light and the indication status of the neighboring traffic light can be determined. For example, if the indication status of the target traffic light TL1 is green, the neighboring traffic light is {TGG, TGR}, if the indication status of TL1 is red, the neighboring traffic light is {TRG, TRR}, if the indication status of TL1 is yellow, Then the neighboring traffic light is {TYG, TYR}.

In S230, the position of the obstacle vehicle is obtained, each possible travel path of the obstacle vehicle at the current intersection is predicted, and the traffic light corresponding to each possible travel path is determined, wherein the neighboring traffic light includes the traffic light corresponding to each possible travel path.

It should be noted that, in addition to predicting the obstacle vehicle, the present disclosure can also predict the behavior of pedestrians, etc., which is not limited here. In the embodiment of the present disclosure, the obstacle vehicle may be another vehicle other than the target vehicle, and the number of obstacle vehicles may be one or more, and one is used as an example for description herein.

In the embodiment of the present disclosure, the position of the obstacle vehicle can be acquired through the sensor, and all possible travel paths of the obstacle vehicle can be predicted. For example, on the opposite side of the intersection, the obstacle vehicle in the opposite direction to the target vehicle can go straight, turn right or turn left, etc.

More specifically, when the position of the obstacle vehicle and the lane topology relationship of the intersection are determined, the lane where the obstacle vehicle is located can be determined according to the position of the obstacle vehicle, and based on the lane topology relationship and the lane where the obstacle vehicle is located, all possible travel paths of the obstacle vehicle at the intersection can be predicted. Assuming that the predicted possible travel path of the obstacle vehicle at the current intersection is TR, TR={L1, L2, . . . , Ln}, wherein Li represents the i-th travel path, and n represents the total number of possible travel paths.

Each possible travel path is formed by at least two lanes in sequence, Li={LANE_1, LANE_2, . . . , LANE_m}, which means that Li is formed by lanes LANE_1, LANE_2, . . . , LANE_m in sequence, and m represents the number of lanes.

After predicting the possible travel path of the obstacle vehicle, the traffic light corresponding to every two consecutive lanes in each possible travel path can be determined according to the mapping relationship among the initial lane, the target lane and the traffic light, i.e., the mapping relationship table established in FIG. 3, and the determined traffic light is used as the traffic light corresponding to the possible travel path. As mentioned above, not all two consecutive lanes have the corresponding traffic light. Generally, a travel path may correspond to one traffic light, of course, may also correspond to multiple traffic lights, or no corresponding traffic light. It should be noted that the neighboring traffic lights refer to other traffic lights at the intersection except the target traffic lights, and the traffic light corresponding to each possible travel path may be one or more of the neighboring traffic lights, that is, the neighboring traffic lights include the traffic light corresponding to each possible travel path.

In S240, the final possible travel path of the obstacle vehicle is determined according to each possible travel path and the indication status of the traffic light corresponding to each possible travel path.

In the embodiment of the present disclosure, since the indication status of the neighboring traffic light can be determined in S220, and the neighboring traffic light include the traffic light corresponding to each possible travel path, the indication status of the traffic light corresponding to each possible travel path can be determined.

For each possible travel path, if the indication status of the traffic light corresponding to the possible travel path is green, it means that the path is available, and the possible travel path is a travel path possible to the obstacle vehicle. At the same time, the speed can also be generated for the path with uniform speed, uniform acceleration, uniform deceleration or a combination of the three, so as to predict the possible driving trajectory of the obstacle vehicle, wherein the driving trajectory includes: travel path, speed, acceleration and angular velocity, etc.

If the indication status of the traffic light corresponding to the possible driving route is red or yellow, it means that the route is not available. Since the lane after the traffic light in the possible travel path is forbidden, while the lane before the traffic light is available, the possible travel path can be updated to the lane before the traffic light.

For example, the possible travel path is formed by connecting the lanes LANE_1, LANE_2 and LANE_3 in sequence, the traffic light is between the lanes LANE_1 and LANE_2, and the indication status of the traffic light is red, then the lane where the obstacle vehicle can travel is LANE_1, and the lane LANE_1 is the possible travel path of the obstacle vehicle.

Specifically, the coordinate sequence of the lane before the traffic light can be obtained from the electronic map, and interpolation processing is performed on the coordinate sequence to obtain the interpolated coordinate sequence. The interpolation method includes but is not limited to: linear interpolation, parabolic interpolation, Lagrangian interpolation and other algorithms. Then, according to the position of the obstacle vehicle, the coordinates behind the obstacle vehicle in the coordinate sequence are removed to obtain the processed coordinate sequence, and the path formed by the processed coordinate sequence is used as the possible travel path of the obstacle vehicle. For example, a possible travel path can be obtained by tracking the processed coordinate sequence through a control algorithm. The control algorithm may include: PID (Proportion Integral Differential) algorithm, LQR (Linear Quadratic Regulator), MPC (Model Predictive Control), PP (Pure-pursuit) algorithm, etc.

Then, the set of all possible travel paths of the obstacle vehicle is taken as the final possible travel path of the obstacle vehicle. For example, in S230, three possible travel paths are predicted, and then the final possible travel paths are also three.

In one embodiment, after the possible travel path is updated to the lane before the traffic light, the driving state of the obstacle vehicle can also be predicted. Since the obstacle vehicle needs to stop when it encounters a red light, when the obstacle vehicle reaches the stop line corresponding to the traffic light, the predicted speed and acceleration of the obstacle vehicle are both 0. If other vehicles have stopped in front of the obstacle vehicle, the speed and acceleration of the obstacle vehicle are predicted to be 0 when the obstacle vehicle travels to the position behind the vehicle closest to itself. Similarly, before the obstacle vehicle stops, the velocity can be generated for the path at a uniform speed, a uniform deceleration, or a combination of the two, to predict the possible travel trajectory of the obstacle vehicle.

In this way, the autonomous vehicle can drive at a constant speed, decelerate, or stop according to the possible driving trajectory of the obstacle vehicle, so as to improve the driving safety of the autonomous vehicle.

Embodiment One

Figure 5:
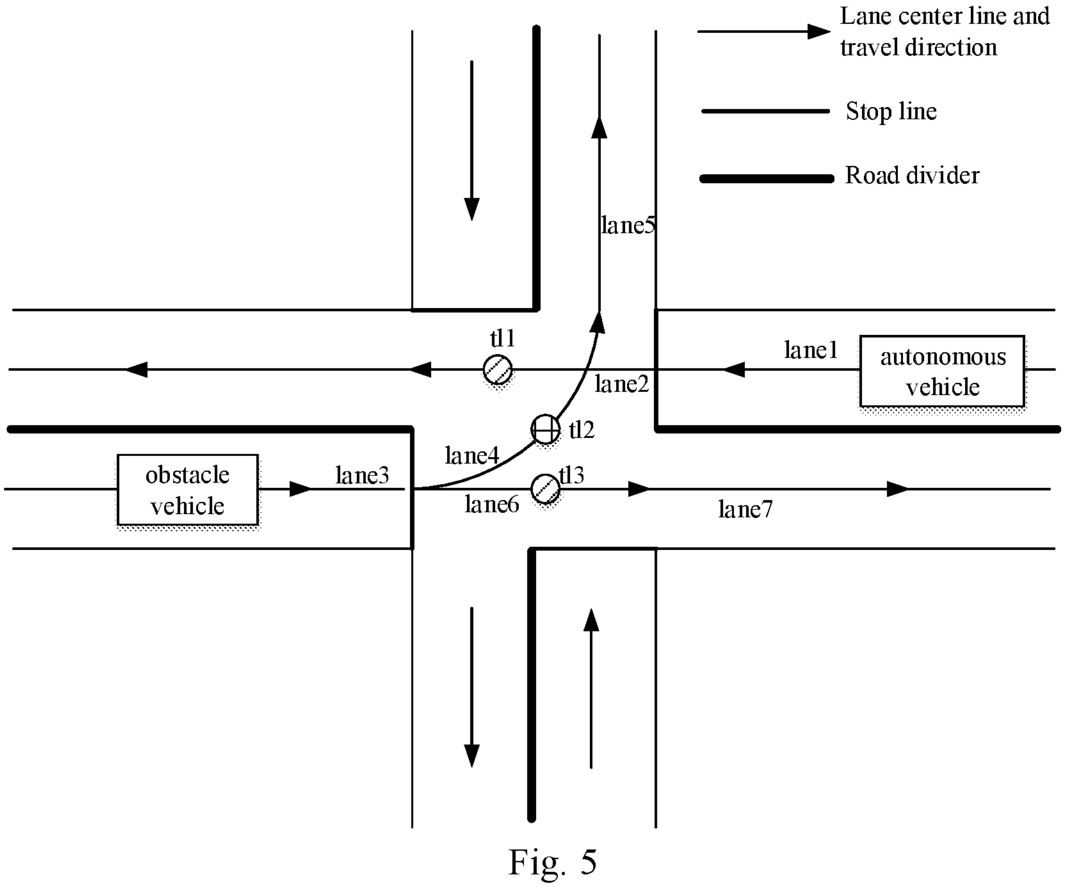
FIG. 5 illustrates a schematic diagram of a lane topology.

Referring to FIG. 5, a schematic diagram of a lane topology is shown, wherein lane1~lane7 represent lanes, and tl1~tl3 represent traffic lights. It can be seen that the traffic light tl1 is passed by when driving from lane1 to lane2, so {lane1, lane2} corresponds to the traffic light tl1. Similarly, {lane3, lane4} correspond to traffic lights tl2, and {lane3, lane6} correspond to traffic lights tl3.

Assuming that at the current moment, the indication status of the traffic light tl1 is green, the indication status of tl2 is red, and the indication status of tl3 is green. The autonomous vehicle is at the position shown in the figure, driving in the direction from lane1 to lane2. The status of the traffic light tl1 can be acquired as green light by capturing an image by the camera installed in the autonomous vehicle. According to the traffic light status mapping relationship table, TGG={tl3}, TGR={tl2} can be obtained, that is, it can be determined that the indication status of tl2 is red light, the indication status of tl3 is green light.

According to the position of the obstacle vehicle, the set of lane sequences TR={tr1, tr2}, can be predicted, where tr1={lane3, lane4, lane5}, tr2={lane3, lane6, lane7}. Since the indication status of tl2 is red light, the final obtained driving lane sequence set of the obstacle vehicle is TR1={tr3, tr2}, where tr3={lane3}. Since it is red light from lane3 to lane4, the obstacle vehicle can at most travel to the stop line corresponding to tl2, where the speed and acceleration are 0, that is, based on the predicted trajectory obtained by tr3, the final speed and acceleration must be 0.

Since there is no red light in tr2, there are no special requirements for the speed and acceleration in the predicted trajectory based on tr2.

It is understandable that if the status of tl2 cannot be accurately obtained, the path based on tr1 may intersect with the travel path of the autonomous vehicle, which will slow down the autonomous vehicle and affect the stability of the autonomous driving.

It can be seen that, in the vehicle behavior prediction method of the embodiment of the present disclosure, by obtaining the indication status of the target traffic light, the indication status of the neighboring traffic light corresponding to the target traffic light can be determined. Since only the indication status of one target traffic light needs to be acquired, the uncertainty of the result caused by acquiring the indication status of multiple traffic lights can be avoided, and the accuracy of determining the indication status of the traffic light can be improved. Then, when the possible travel path of the obstacle vehicle is determined according to the position of the obstacle vehicle and the indication status of the neighboring traffic light, the accuracy of the possible travel path prediction can be improved. Furthermore, the smoothness and safety of driving of the autonomous vehicle can be improved.

It should be noted that although various steps of the methods of the present disclosure are depicted in the figures in a particular order, this does not require or imply that the steps must be performed in that particular order, or that all illustrated steps must be performed to achieve the desired the result. Additionally or alternatively, certain steps may be omitted, multiple steps may be combined into one step for execution, and/or one step may be decomposed into multiple steps for execution, and the like.

Figure 6:
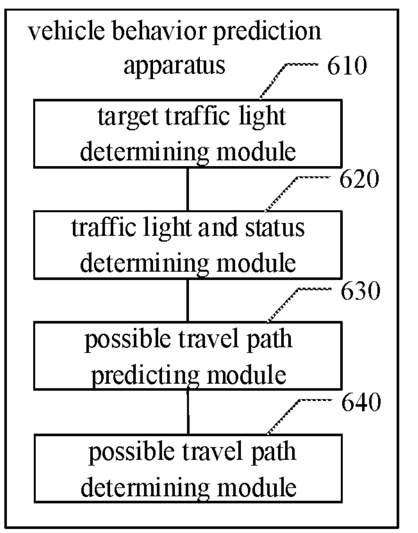
FIG. 6 illustrates a schematic structural diagram of a vehicle behavior prediction apparatus in an embodiment of the present disclosure.

Further, in this exemplary embodiment, a vehicle behavior prediction apparatus 600 is also provided, as shown in FIG. 6, the apparatus includes:

- a target traffic light determining module 610, configured to acquire a path that a target vehicle will travel at a current intersection and determine a target traffic light corresponding to the path;
- a traffic light and status determining module 620, configured to determine a neighboring traffic light corresponding to the target traffic light and the indication status of the neighboring traffic light according to the target traffic light, the indication status of the target traffic light and a traffic light status mapping relationship table;
- a possible travel path predicting module 630, configured to acquire a position of an obstacle vehicle, predict each possible travel path of the obstacle vehicle at the current intersection according to the position of the obstacle vehicle, and determine a traffic light corresponding to each possible travel path, wherein the neighboring traffic light includes the traffic light corresponding to each possible travel path; and
- a possible travel path determining module 640, configured to determine a final possible travel path of the obstacle vehicle according to each possible travel path and the indication status of the traffic light corresponding to each possible travel path.

In one embodiment, the vehicle behavior prediction apparatus further includes:

- a lane and traffic light mapping relationship establishing module, configured to determine a drivable path of each intersection according to a lane topology relationship in an electronic map; wherein the drivable path includes an initial lane and a target lane; and
- determine, for each drivable path, a traffic light on the travel path from the initial lane to the target lane, and establish a mapping relationship among the initial lane, the target lane and the traffic light.

In one embodiment, the vehicle behavior prediction apparatus further includes:

- a traffic light status reciprocal establishing module, configured to: for each intersection in an electronic map, obtain the indication status of a single traffic light at the intersection, and the indication status of other traffic light at the intersection during the indication status of the single traffic light; and
- establish a mapping relation among the single traffic light, the indication status of the single traffic light, the other traffic light and the indication status of the other traffic light, to obtain the traffic light status mapping relationship table.

In one embodiment, the possible travel path determining module is particularly configured to obtain the position of the obstacle vehicle, determine a lane in which the obstacle vehicle is located according to the position; and predict each possible travel path of the obstacle vehicle at the current intersection according to the lane in which the obstacle vehicle is located and the lane topology relationship.

In one embodiment, each possible travel path is formed by at least two lanes in sequence; and

- the possible travel path determining module is configured to determine the traffic light corresponding to each possible travel path by:
- determining the traffic light corresponding to every two consecutive lanes in each possible travel path, according to the mapping relationship among the initial lane, the target lane and the traffic light; and
- using the determined traffic light as the traffic light corresponding to each possible travel path.

In one embodiment, the possible travel path determining module is configured to: for each possible travel path, if the indication status of the traffic light corresponding to the possible travel path is a red light or a yellow light, update the possible travel path to the lane before the traffic light; and

- determine a set including each possible travel path of the obstacle vehicle as the final possible travel path of the obstacle vehicle.

In one embodiment, the possible travel path determining module is configured to update the possible travel path to the lane before the traffic light by:

- obtaining a coordinate sequence of the lane before the traffic light;
- removing coordinates located behind the obstacle vehicle in the coordinate sequence according to the position of the obstacle vehicle, to obtain a processed coordinate sequence; and
- determining a path formed by the processed coordinate sequence as the possible travel path of the obstacle vehicle.

In one embodiment, the vehicle behavior prediction apparatus further includes:

- a driving state predicting module, configured to predict that a speed and an acceleration of the obstacle vehicle are both zero when the obstacle vehicle reaches a stop line corresponding to the traffic light.

The specific details of each module or unit in the above apparatus have been described in detail in the corresponding method, and thus are not repeated here.

According to some embodiments, the present disclosure provides an electronic device, including: a processor; and a memory, configured to store instructions executable by the processor, wherein the processor is configured to implement any one of the above method by executing the instructions.

According to some embodiments, the present disclosure provides a storage medium having a computer program stored thereon, which when being executed by a processor, implements any one of the above method.

It should be noted that although several modules or units of the apparatus for action performance are mentioned in the above detailed description, this division is not mandatory. Indeed, according to embodiments of the present disclosure, the features and functions of two or more modules or units described above may be embodied in one module or unit. Conversely, the features and functions of one module or unit described above may be further divided into multiple modules or units to be embodied.

Other embodiments of the present disclosure will be readily appreciated to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the following claims.

The embodiments of the present disclosure may have at least some or all of the following beneficial effects:

In the vehicle behavior prediction method and apparatus of the embodiments of the present disclosure, when the target vehicle is traveling, the corresponding target traffic light may be determined according to the path the target vehicle will travel, and the indication status of other neighboring traffic lights may be determined according to the indication status of the target traffic light. After that, according to the position of the obstacle vehicle, in conjunction with the indication status of the neighboring traffic lights, the final possible travel path of the obstacle vehicle is determined, which can improve the accuracy of the behavior prediction of the obstacle vehicle. Further, according to the final possible travel path of the obstacle vehicle, the driving stability and safety of the target vehicle can be improved.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A vehicle behavior prediction method, comprising:

acquiring a path that a target vehicle will travel at a current intersection;

determining a target traffic light corresponding to the path;

acquiring an indication status of the target traffic light;

determining a neighboring traffic light corresponding to the target traffic light and the indication status of the neighboring traffic light according to the target traffic light, the indication status of the target traffic light and a traffic light status mapping relationship table, wherein the neighboring traffic light is a traffic light at the current intersection controlling traffic in a direction different from that of the target traffic light;

acquiring a position of an obstacle vehicle;

predicting each possible travel path of the obstacle vehicle at the current intersection according to the position of the obstacle vehicle, and determining a traffic light corresponding to each possible travel path, wherein the neighboring traffic light comprises a traffic light corresponding to each possible travel path; and determining a final possible travel path of the obstacle vehicle according to each possible travel path and the indication status of the traffic light corresponding to each possible travel path, wherein the determining the final possible travel path of the obstacle vehicle according to each possible travel path and the indication status of the traffic light corresponding to each possible travel path comprises:

for each possible travel path, if the indication status of the traffic light corresponding to the possible travel path is a red light or a yellow light, updating the possible travel path to a lane before the traffic light; and determining a set including each possible travel path of the obstacle vehicle as the final possible travel path of the obstacle vehicle, wherein the method further comprises: determining a drivable path of each intersection according to a lane topology relationship in an electronic map; wherein the drivable path comprises an initial lane and a target lane; and determining, for each drivable path, a traffic light on the travel path from the initial lane to the target lane, and establishing a mapping relationship among the initial lane, the target lane and the traffic light, wherein the predicting each possible travel path of the obstacle vehicle at the current intersection according to the position of the obstacle vehicle comprises: determining a lane in which the obstacle vehicle is located according to the position; and predicting each possible travel path of the obstacle vehicle at the current intersection according to the lane in which the obstacle vehicle is located and the lane topology relationship, and wherein each possible travel path is formed by at least two lanes in sequence from the initial lane to the target lane; and the determining the traffic light corresponding to each possible travel path comprises:

determining the traffic light corresponding to every two consecutive lanes in each possible travel path, according to the mapping relationship among the initial lane, the target lane and the traffic light; and using the determined traffic light as the traffic light corresponding to each possible travel path.

2. The method according to claim 1, wherein establishing of the traffic light status mapping relationship table comprises:

for each intersection in an electronic map, obtaining the indication status of a single traffic light at the intersection, and the indication status of other traffic light at the intersection during the indication status of the single traffic light; and establishing a mapping relation among the single traffic light, the indication status of the single traffic light, the other traffic light and the indication status of the other traffic light, to obtain the traffic light status mapping relationship table.

3. The method according to claim 1, wherein the updating the possible travel path to the lane before the traffic light comprises:

obtaining a coordinate sequence comprising coordinate of each lane in the lane before the traffic light;

removing coordinates located behind the obstacle vehicle in the coordinate sequence according to the position of the obstacle vehicle, to obtain a processed coordinate sequence; and determining a path formed by the processed coordinate sequence as the possible travel path of the obstacle vehicle.

4. The method according to claim 1, wherein after updating the possible travel path to the lane before the traffic light, the method further comprises:

predicting that a speed and an acceleration of the obstacle vehicle are both zero when the obstacle vehicle reaches a stop line corresponding to the traffic light.

5. An electronic device, comprising:

a processor; and a memory, configured to store instructions executable by the processor, wherein the processor is configured to implement the method according to claim 1 by executing the instructions.

6. A non-transitory storage medium having a computer program stored thereon, which when being executed by a processor, implements the method according to claim 1.

7. A vehicle behavior prediction apparatus, comprising a processor; and a memory, configured to store instructions executable by the processor, wherein the processor is configured to execute the instructions and causes the vehicle behavior prediction apparatus to:

acquire a path that a target vehicle will travel at a current intersection and determine a target traffic light corresponding to the path;

acquire an indication status of the target traffic light, and determine a neighboring traffic light corresponding to the target traffic light and the indication status of the neighboring traffic light according to the target traffic light, the indication status of the target traffic light and a traffic light status mapping relationship table, wherein the neighboring traffic light is a traffic light at the current intersection controlling traffic in a direction different from that of the target traffic light;

acquire a position of an obstacle vehicle, predict each possible travel path of the obstacle vehicle at the current intersection according to the position of the obstacle vehicle, and determine a traffic light corresponding to each possible travel path, wherein the neighboring traffic light comprises the traffic light corresponding to each possible travel path; and determine a final possible travel path of the obstacle vehicle according to each possible travel path and the indication status of the traffic light corresponding to each possible travel path, wherein the vehicle behavior prediction apparatus is further caused to:

for each possible travel path, if the indication status of the traffic light corresponding to the possible travel path is a red light or a yellow light, update the possible travel path to a lane before the traffic light; and determine a set including each possible travel path of the obstacle vehicle as the final possible travel path of the obstacle vehicle, wherein the vehicle behavior prediction apparatus is further caused to: determine a drivable path of each intersection according to a lane topology relationship in an electronic map; wherein the drivable path comprises an initial lane and a target lane; and determine, for each drivable path, a traffic light on the travel path from the initial lane to the target lane, and establish a mapping relationship among the initial lane, the target lane and the traffic light, wherein the vehicle behavior prediction apparatus is further caused to obtain the position of the obstacle vehicle, determine a lane in which the obstacle vehicle is located according to the position; and predict each possible travel path of the obstacle vehicle at the current intersection according to the lane in which the obstacle vehicle is located and the lane topology relationship, and wherein each possible travel path is formed by at least two lanes in sequence from the initial lane to the target lane; and wherein the vehicle behavior prediction apparatus is further caused to determine the traffic light corresponding to each possible travel path by:

determining the traffic light corresponding to every two consecutive lanes in each possible travel path, according to the mapping relationship among the initial lane, the target lane and the traffic light; and using the determined traffic light as the traffic light corresponding to each possible travel path.

8. The vehicle behavior prediction apparatus according to claim 7, wherein the vehicle behavior prediction apparatus is further caused to:

for each intersection in an electronic map, obtain the indication status of a single traffic light at the intersection, and the indication status of other traffic light at the intersection during the indication status of the single traffic light; and establish a mapping relation among the single traffic light, the indication status of the single traffic light, the other traffic light and the indication status of the other traffic light, to obtain the traffic light status mapping relationship table.

9. The vehicle behavior prediction apparatus according to claim 7, wherein the vehicle behavior prediction apparatus is further caused to update the possible travel path to the lane before the traffic light by:

obtaining a coordinate sequence comprising coordinate of each lane in the lane before the traffic light;

removing coordinates located behind the obstacle vehicle in the coordinate sequence according to the position of the obstacle vehicle, to obtain a processed coordinate sequence; and determining a path formed by the processed coordinate sequence as the possible travel path of the obstacle vehicle.

10. The vehicle behavior prediction apparatus according to claim 7, wherein the vehicle behavior prediction apparatus is further caused to:

predict that a speed and an acceleration of the obstacle vehicle are both zero when the obstacle vehicle reaches a stop line corresponding to the traffic light.

* * * * *